United States Patent [19]

Morrison, III

[11] Patent Number: 4,773,575
[45] Date of Patent: Sep. 27, 1988

[54] UTILITY RACK SUPPORT ASSEMBLY

[76] Inventor: Charles E. Morrison, III, Star Rte. 3, Box 240-AD, La Plata, Md. 20646

[21] Appl. No.: 877,694

[22] Filed: Jun. 19, 1986

Related U.S. Application Data

[63] Continuation of Ser. No. 636,211, Jul. 31, 1984, abandoned.

[51] Int. Cl.$^4$ .................................................. B60R 9/00
[52] U.S. Cl. .................................. 224/42.42; 224/273; 296/37.6
[58] Field of Search ............... 224/273, 309, 320, 325, 224/326, 42.42; 248/514, 539; 296/3, 37.6, 10, 24 R

[56] References Cited

U.S. PATENT DOCUMENTS

| | | | |
|---|---|---|---|
| 1,057,268 | 3/1913 | Phillips | 248/539 |
| 2,565,746 | 8/1951 | Turner | 296/104 |
| 2,690,318 | 9/1954 | Kusiv | 248/539 |
| 3,190,594 | 6/1965 | Chion | 248/514 |
| 3,208,703 | 9/1965 | Arnold et al. | 248/536 |
| 3,595,452 | 7/1971 | Anderson | 224/320 |
| 4,065,041 | 12/1977 | Stegavig et al. | 296/3 |
| 4,215,894 | 8/1980 | Sidlinger | 296/3 |
| 4,378,127 | 3/1983 | Rossi, Sr. | 296/3 |
| 4,449,656 | 5/1984 | Wouden | 224/320 |

Primary Examiner—Henry J. Recla
Assistant Examiner—David Voorhees
Attorney, Agent, or Firm—Gerald J. Ferguson, Jr.

[57] ABSTRACT

Utility rack support assembly for mounting on the base rail of a truck bed enclosure of a pick-up truck. The assembly includes mounting brackets fixed to the enclosure base rail, and a utility rack attached to the brackets and extending over the enclosure.

4 Claims, 3 Drawing Sheets

UTILITY RACK SUPPORT ASSEMBLY

This application is a continuation of Ser. No. 636,211, filed July 31, 1984, now abandoned.

The present invention relates to a utility rack support assembly suitable for mounting on a base rail of a truck bed enclosure of a pick-up truck.

BACKGROUND OF THE INVENTION

The use of utility racks on vehicles, and especially pick-up trucks, is becoming increasingly popular as the owners of those vehicles attempt to increase the versatility and usefulness of their vehicles. One area in which the use of utility racks has become particularly prevalent is in connection with the pick-up trucks having an enclosure, for example a pre-fabricated fiber glass camper unit or the like, mounted on the bed of the truck. Since the enclosure covers substantially the bed of the truck, the utility racks are most often secured to the enclosure by means of support members bolted to the side walls or the roof of the enclosure.

One such arrangement is disclosed in U.S. Pat. No. 3,888,538 disclosing a utility rack which is attached to the end walls or the side walls of a truck bed enclosure by means of brackets. Each bracket is mounted on the enclosure by drilling holes through the end walls or side walls of the enclosure and bolting the bracket to the enclosure. A bearing plate is provided on the inside wall of the enclosure to distribute the load of the bolts over a substantial area of the wall to prevent stress concentrations on the enclosure wall.

U.S. Pat. No. 2,846,262 discloses an attachment for a pick-up truck comprising a frame work provided with a flexible waterproof covering which can serve as a truck cover, a bedstead or a tent.

U.S. Pat. No. 2,901,286 discloses a utility rack which can be mechanically raised or lowered through holes provided in upper side surfaces of a pick-up bed enclosure.

U.S. Pat. No. 3,765,713 discloses a carrier rack supported by upwardly extending posts mounted on the side of the truck bed at its corners.

U.S. Pat. No. 2,925,303 discloses a frame enclosure which is easily attached and detached from a truck body, and which includes snap fasteners for attaching a canvas top over the frame.

SUMMARY OF THE INVENTION

While the prior utility racks discussed above enjoy certain advantages, they do suffer from one noteable problem, and that is the fact that they are attached to the enclosure through the end walls, side walls and/or roof of the enclosure. This usually requires holes to be drilled in the side walls which introduces structural weaknesses and gives rise to possible leakage problems, and also is unsightly and inconvenient when the utility rack is removed from the enclosure.

It has now been found, according to the present invention, that the disadvantages noted above can be overcome by mounting a utility rack to the base rail of a pick-up bed enclosure, thereby avoiding the necessity of providing holes in the exterior walls of the enclosure and the attendant disadvantages noted above.

Therefore, in accordance with one aspect of the present invention, there is provided a utility rack support assembly suitable for mounting on the base rail of a pick-up bed enclosure, comprising a base rail mounting means for mounting the assembly to the enclosure base rail, and a load supporting means connected to the base rail mounting means for supporting a load thereon.

According to another aspect of the present invention, there is provided a utility rack mounting kit including one or more brackets mountable on a base rail of a pick-up bed enclosure, and a utility rack connectable to the brackets.

According to a yet further feature of the present invention, there is provided a bracket for mounting a utility rack on a base rail of a pick-up bed enclosure. The bracket includes bracket mounting means for mounting the bracket to the enclosure base rail, first securing means formed in the bracket mounting means for securing the bracket mounting means to the base rail, connecting means integral with the bracket mounting means and disposed substantially at right angles to the bracket mounting means for supporting the utility rack, and second securing means formed in the connecting means for securing the utility rack to the connecting means.

In a preferred embodiment, the bracket of the invention comprises an elongate mounting plate and a support plate which is shorter than the elongate mounting plate and is disposed centrally of and substantially at right angles to the elongate mounting plate, with the elongate mounting plate and the support plate each being provided with a plurality of apertures for mounting to the base rail of the enclosure and the utility rack, respectively.

According to yet further feature of the present invention, there is provided a pick-up bed enclosure comprising a utility rack support assembly of the invention mounted to the enclosure base rail. The enclosure may comprise at least one pair of the brackets of the invention mounted on the base rail of the enclosure, and preferably further includes a utility rack mounted to those brackets. In a preferred embodiment, the enclosure base rail is provided with a reinforcing means, for example a reinforcing section or plug, to provide added strength and support for the brackets mounted on the base rail.

DETAILED DESCRIPTION OF THE DRAWINGS

Figure 1:
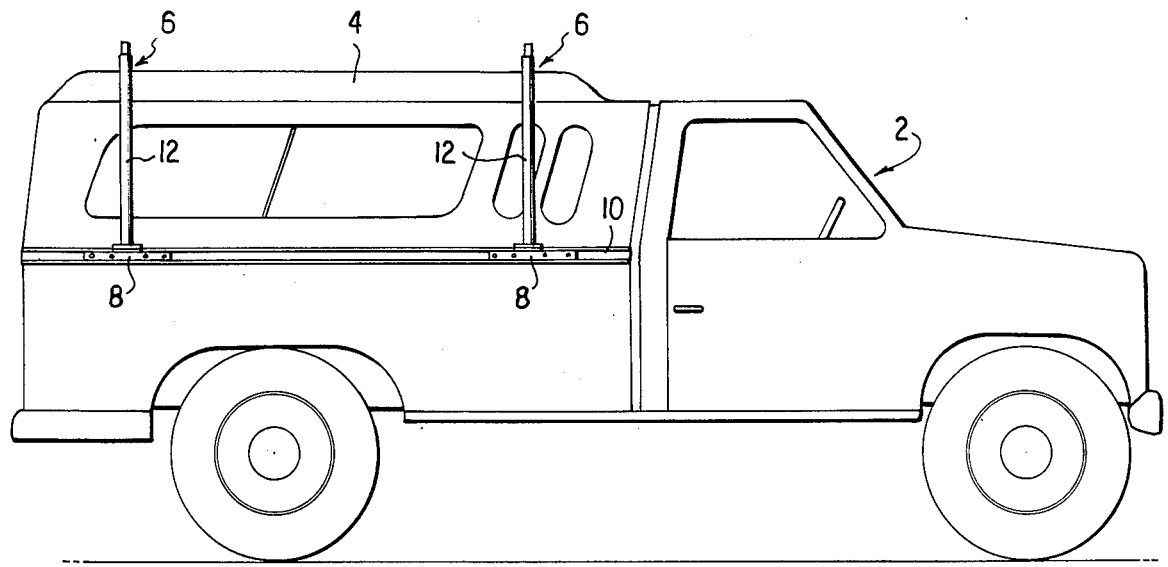
Figure 2:
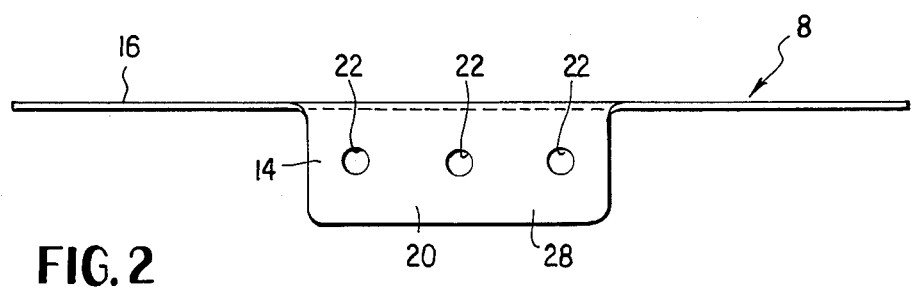
Figure 3:
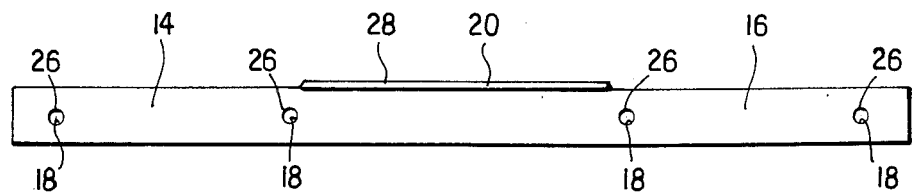
Figure 4:
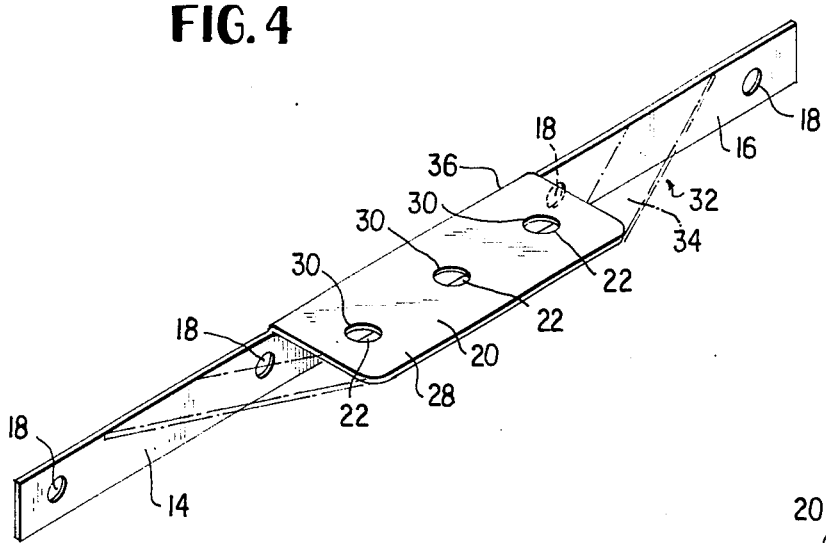
Figure 5:
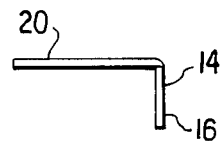
Figure 6:
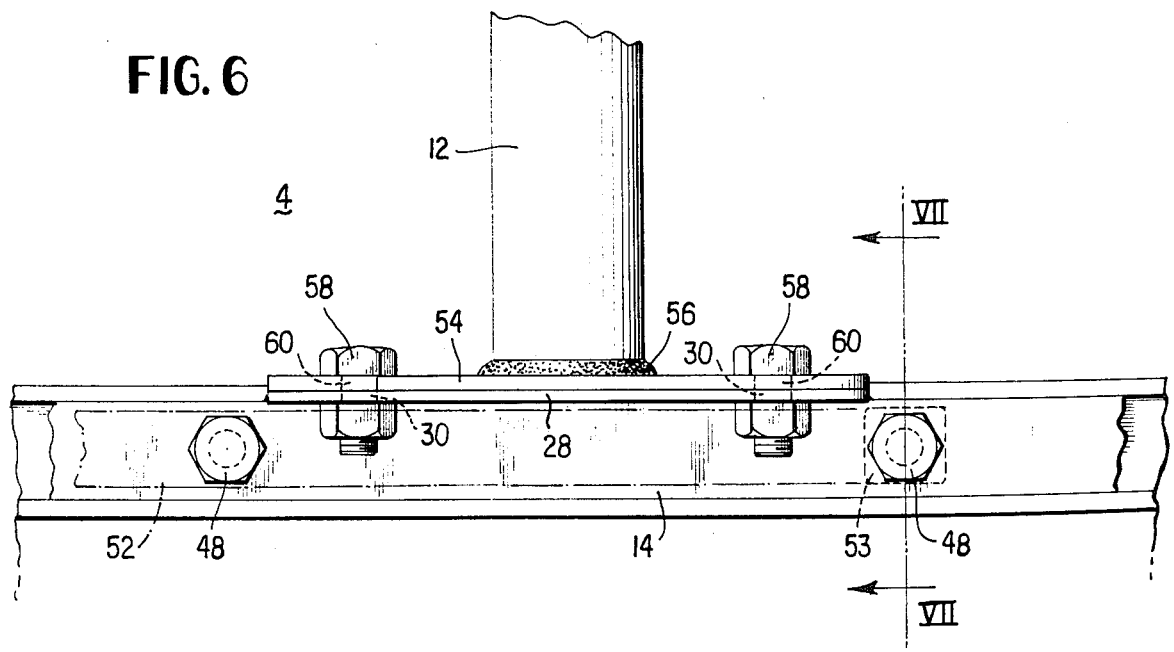
Figure 7:
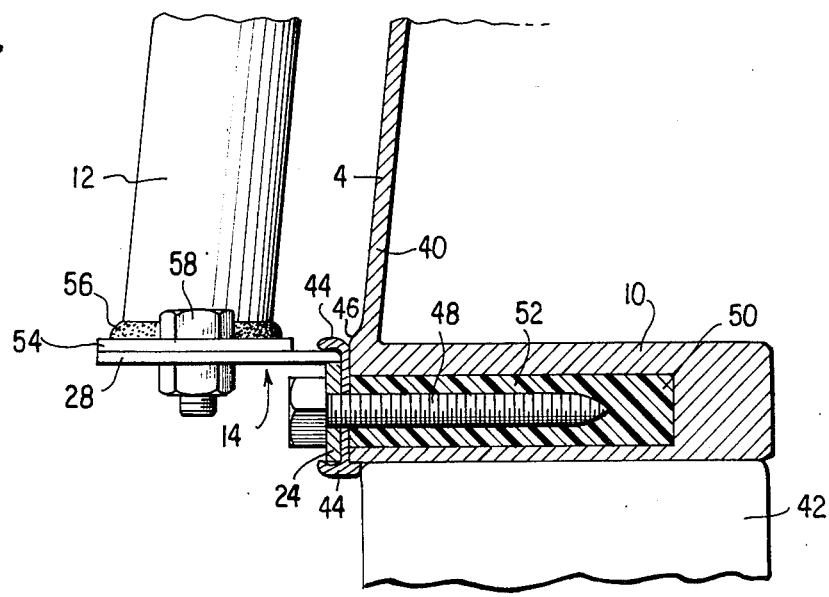
Figure 8:
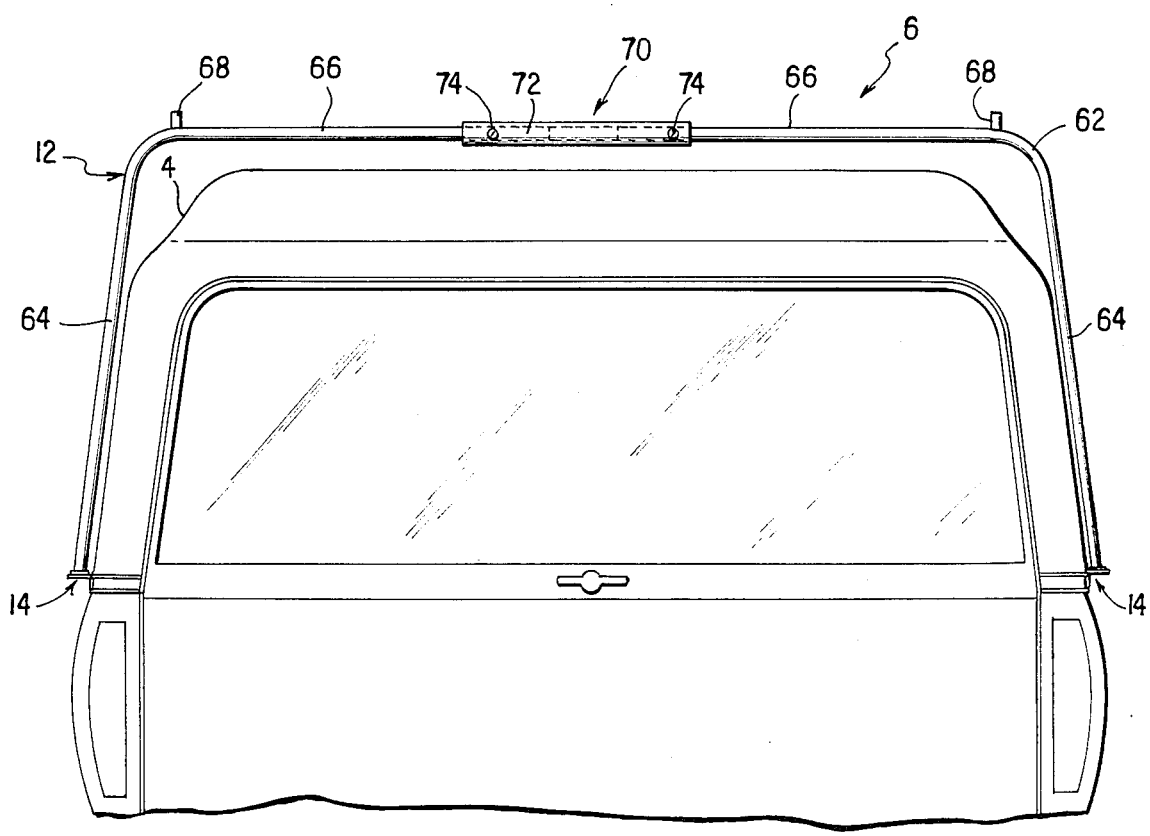

The above embodiments will now be described in more detail with reference to the accompanying drawings in which:

(a) FIG. 1 is a side elevation of a pick-up truck carrying an enclosure with a utility rack support assembly of the present invention mounted thereon;

(b) FIG. 2 is a plan elevation of a bracket of the invention;

(c) FIGS. 3 through 5 are front, perspective and end views, respectively, of the bracket of FIG. 2;

(d) FIG. 6 is an enlarged view showing the assembly of the invention mounted to an enclosure base rail;

(e) FIG. 7 is a cross-sectional side elevation taken along the line VII—VII of FIG. 6; and (f) FIG. 8 is a rear view of the pick-up truck shown in FIG. 1.

DETAILED DESCRIPTION OF THE INVENTION

Referring to FIG. 1, there is illustrated a pickup truck 2 carrying an enclosure 4 with a utility rack support assembly 6 of the present invention mounted on the enclosure 4. Each support assembly 6 includes a base rail mounting means 8 for mounting the assembly to a base rail 10 of the enclosure, and a load supporting means 12 for supporting a load thereon.

Referring to FIGS. 2 through 5, there is shown a preferred form of the base rail supporting means 8 in the form of a bracket 14, including a bracket mounting means 16 for mounting the bracket to the base rail 10 of the enclosure 4, and a first securing means 18 formed in the bracket mounting means 16 for securing the bracket to the base rail 10. The bracket also includes a connecting means 20 integral with the bracket mounting means 16 and disposed substantially at right angles to the bracket mounting means for supporting the load supporting means 12. A second securing means 22 is formed in the connecting means 20 for securing the load supporting means 12 thereto.

As seen from FIGS. 2 through 5, the bracket mounting means 16 comprises an elongate mounting plate 24 having, as the first securing means, a plurality of first apertures 26 spaced at equal intervals along the length of the elongate mounting plate 24. The connecting means 20 comprises a support plate 28 which is shorter than the elongate mounting plate 24 and is disposed centrally of the elongate mounting plate 24 and substantially at right angles thereto. The support plate 28 is provided with a plurality of the second apertures 30 equally spaced from each other along the length of the support plate 28.

In the accompanying drawings, the number of first apertures 26 is shown to be 4 and the number of second apertures 30 is shown to be 3. However, it is to be understood that those particular numbers are not critical, and any suitable number of apertures may be provided according to the respective lengths and widths of the mounting plate and support plate.

As illustrated in dotted relief in FIG. 4, the bracket may further include reinforcing means 32 extending between the support plate 28 and the elongate mounting plate 24 for reinforcing and maintaining those two plates substantially at right angles with respect to each other. The reinforcing means 32 may extend from a front corner 34 of the support plate 28 to the elongate mounting plate or from any point between the corner 34 and the point of attachment 36 of the support plate 28 to the elongate mounting plate 24, for example at 38.

Referring to FIGS. 6 and 7, the bracket 14 is shown mounted to the base rail 10 of the enclosure 4. As seen in FIG. 7, the enclosure 4, typically formed of reinforced plastic or fiber glass, includes side walls 40 and a base rail 10 integrally formed with the side walls 40. The base rail 10 is substantially thicker than the side walls 40, and is dimensioned such that it sits on an upper surface of the bed side walls 42. In the embodiment shown in FIGS. 6 and 7, a trim strip 44 is provided between an exterior surface 46 of the base rail 10 and the bracket 14, and the elongate mounting plate 24 is fixedly attached to the trim strip 44 by means of screws 48 extending into the base rail 10.

To afford additional strength and support, the base rail 10 is provided with a reinforcing means 50 into which the screws 48 are screwed. It will be understood that the entire base rail 10 may be made of reinforced material, such as reinforced fiber glass, to provide the reinforcing means 50, or the reinforcing means 50 may comprise a reinforcing strip 52 or plug 53, for example of a high density plastic material, provided in the base rail 10 as shown in FIGS. 6 and 7.

The load supporting means 12 is mounted to the support plate 28 by an attaching means, for example, a foot plate 54 which is welded to the load supporting means 12 at 56. The foot plate 54 and support plate 28 are fixedly attached together by means of bolts 58 extending through apertures 60 formed in the foot plate 54 and the alignable with the second apertures 30 in the support plate 28.

Referring to FIG. 8, the utility rack support assembly 6 is shown as including the load supporting means 12 having a substantially U-shaped arrangement 62 connected to brackets 14, and including side members 64 connected to a cross member 66 having load stops 68 for preventing sideways movement of a load on the cross member 66. The side members 64 and cross member 66 may be integrally formed or, as is preferred, an expansion means 70 is provided for adjusting the distance between the side members 64 according to the width dimension of the enclosure 4. The expansion means 70 comprises a tubular member 72, and each side member 64 is essentially L-shaped with the respective ends which extend over the roof of the enclosure 4 being telescopingly receivable in the tubular member 72. The expansion means 70 includes a locking means 74, for example bolts extending through aligned holes in the tubular member 72 and the ends of the members 64 received in member 72, for locking the side members 64 in a fixed spaced-apart configuration according to the width dimension of the enclosure 4.

From the above description, it will be clear that the utility rack support assembly of the present invention enjoys numerous advantages which make it a significant technical advance over prior pick-up enclosure utility rack arrangements. In particular, the utility rack support assembly of the present invention is mounted to the base rail 10 of the enclosure 4 and not to the exterior walls of the enclosure, thereby assuring increased support and strength without having to drill holes in the exterior walls of the enclosure. A further advantage is that the utility rack can be removed without leaving unsightly and inconvenient holes in the external walls of the enclosure 4, and the remaining brackets 14 are unobtrusive and may be left permanently mounted to the base rail 10 ready for future attachment of the utility rack when desired.

What is claimed is:

1. In combination, for use with a pick-up truck having a bed with sidewalls, the combination comprising
an enclosure for said bed, said enclosure including (a) vertically disposed, fiber glass or reinforced plastic sidewalls and (b) inwardly directed, horizontally disposed, base rails substantially extending the length of the enclosure sidewalls and respectively connected to the lower ends of the enclosure sidewalls such that the base rails are respectively in substantial direct contact with the upper surfaces of the bed sidewalls;
a utility rack mounting member including (a) at least a pair of vertically disposed, first plates respectively connected to said base rails and (b) a pair of horizontally disposed, outwardly extending, second plates respectively connected to said first plates;
first securing means for respectively attaching said first plates to said base rails where the first securing means horizontally extend into said horizontally disposed base rail;

a utility rack including at least a pair of vertically extending legs disposed on opposite sides of said enclosure; and second securing means for respectively, removably attaching said pair of utility rack legs to said second pair of plates whereby the load transmitted from said utility rack is effectively transmitted through the utility rack legs, said utility rack mounting member, and said base rail to the bed sidewalls due to the horizontal extension of the first securing means into the horizontally disposed base rail wherein said utility rack further includes a third pair of plates respectively fixedly connected to the lower ends of said utility rack legs and where said second securing means removably attaches said third pair of plates of said utility rack legs to said second pair of plates.

2. The combination as in claim 1 where said base rail includes reinforcing means incorporated therein and where said first securing means extends into said reinforcing means.

3. The combustion as in claim 1 where said base rails are respectively integrally connected to said sidewalls.

4. The combination as in claim 1 where said second plates are respectively, integrally connected to the first plates.

* * * * *